United States Patent [19]

Moore

[11] 3,784,367
[45] Jan. 8, 1974

[54] PRODUCTION OF POTASSIUM POLYPHOSPHATES
[75] Inventor: William Percy Moore, Chester, Va.
[73] Assignee: Allied Chemical Corporation, New York, N.Y.
[22] Filed: Aug. 10, 1971
[21] Appl. No.: 170,641

[52] U.S. Cl.................... 71/36, 423/310, 423/313, 71/34
[51] Int. Cl............................................... C05b 7/00
[58] Field of Search ...................... 71/34–36, 43; 423/309, 310, 313, 315, 481

[56] References Cited
UNITED STATES PATENTS

| | | | |
|---|---|---|---|
| 3,347,656 | 10/1967 | Potts et al. | 71/36 |
| 3,554,729 | 1/1971 | Cewless | 71/34 |
| 3,677,734 | 7/1972 | Carroll et al. | 71/34 |
| 3,382,059 | 5/1968 | Getzinger | 71/34 |
| 3,409,392 | 11/1968 | Shiver | 423/309 |
| 2,288,418 | 6/1942 | Partridge | 71/34 |
| 3,081,150 | 3/1963 | Beltz et al. | 423/481 |
| 3,607,018 | 9/1971 | Moore et al. | 423/481 |
| 1,456,831 | 5/1923 | Ross et al. | 423/313 |
| 3,393,044 | 7/1968 | Blumberg | 423/310 |
| 2,894,813 | 7/1959 | Baniel | 423/481 |
| 3,708,275 | 1/1973 | Camp | 423/309 |

Primary Examiner—Samih N. Zaharna
Assistant Examiner—Richard Barnes
Attorney—Fred L. Kelly et al.

[57] ABSTRACT

A process for producing a potassium polyphosphate fertilizer solution wherein the available amount of phosphoric anhydride is totally water soluble and is, therefore, suitable for the manufacture of liquid fertilizers. Concentrated wet-process phosphoric acid containing polyphosphoric acids is reacted with potassium chloride at a reaction temperature of 150°–500°C. in the presence of a dehydrochlorination catalyst. Hydrogen chloride is vaporized from the reaction melt and the melt is quenched in aqueous alkaline solution to produce the potassium polyphosphate fertilizer solution.

1 Claim, No Drawings

PRODUCTION OF POTASSIUM POLYPHOSPHATES

BACKGROUND OF THE INVENTION

This invention relates to the production of potassium polyphosphate solutions. More particularly, it relates to the production of stable potassium polyphosphate fertilizer solutions by the direct reaction of potassium chloride and concentrated phosphoric acid derived from wet-process acid.

Wet-process phosphoric acid is produced by decomposing phosphate rock, particularly calcium phosphate, with sulfuric acid and separating the phosphoric acid from the precipitated calcium sulfate. The resulting crude phosphoric acid contains various amounts of impurities such as iron, aluminum, calcium, magnesium and other metals in the form of their phosphates, sulfates or fluorides, depending on the characteristics of the particular phosphate rock which is used as a starting material. Because of the simplicity and cheapness of its manufacture, wet-process phosphoric acid is regarded as an excellent source of fertilizer grade phosphates. However, because of the presence of the aforementioned impurities its use is fraught with many difficulties and complications.

As is well known, when wet-process phosphoric acid is reacted with potassium hydroxide or potassium chloride to form aqueous potassium phosphate solutions, the impurities present in the acid form gelatinous precipitates which are extremely difficult to separate from the aqueous phase by filtration or other conventional methods. These precipitates form large deposits in the equipment used for storage and transfer and make handling difficult. The prior art discloses several attempts to overcome this difficulty. The use of sequestering agents, such as sodium hexametaphosphate, has proved unsatisfactory. Other methods involve heat treatment under controlled conditions to form acyclic polyphosphate compounds which retain the metal impurities in solution, but such methods have the disadvantage of tieing up substantial amounts of the phosphate as relatively insoluble metaphosphates.

Still another method for overcoming the aforementioned problem comprises neutralizing the crude phosphoric acid with potassium hydroxide at elevated pressure and temperature to cause the metal compounds to precipitate in a form which is readily filtered from the resulting polyphosphate solution. This process has the disadvantage of requiring pressure resistant equipment which adds to the cost.

U. S. Pat. No. 3,414,375 discloses the formation of polyphosphates by reacting phosphoric acid and potassium chloride at temperatures of 200°–1000°C. It is also disclosed that the solubility of the polyphosphate product depends upon the rapidity of cooling. Unfortunately, the process of this patent produces chiefly metaphosphates which are relatively water insoluble. Moreover, high temperatures of say 560°–850°C. are required for substantially complete reaction of the potassium chloride and such high temperatures favor production of metaphosphates.

U. S. Pat. No. 3,081,150 discloses the manufacture of condensed alkali metal phosphates from phosphoric acid and alkali metal chlorides by spraying the reactants into a chamber containing hot gas and separating the by-product hydrogen chloride and hot gas. However, the condensed phosphate products disclosed contain either substantial proportions of insoluble metaphosphates or substantial proportions of unreacted chloride, depending apparently on the reactant mol ratio and/or the reaction temperature.

U. S. application Ser. No. 742,096 filed July 2, 1968, now U.S. Pat. No. 3,607,018 assigned to Allied Chemical Corporation, is directed to production of alkali metal polyphosphates that are water soluble and free of both chloride ion and metaphosphates. A mixture of alkali metal chloride and excess of phosphoric acid is heated in finely divided form in a hot gas at a temperature of about 250° to 400°C. for a relatively short period of time.

The resulting alkali metal polyphosphates are separated from the hot gas containing hydrogen chloride and quickly cooled to a temperature of less than about 80°C.

Although the process of U. S. application Ser. No. 742,096 now U.S. Pat. No. 3,607,018 is an important contribution to the art, research studies have continued in an effort to develop a more economic procedure utilizing relatively smaller equipment having lower capital costs. Also, it would be highly desirable to find a direct reaction process that would produce concentrated hydrogen chloride rather than dilute hydrogen chloride-hot gas mixture obtained in the process of the above-identified application.

SUMMARY OF THE INVENTION

In view of the foregoing, it is an object of the present invention to provide an improved process for producing potassium polyphosphate solutions from wet-process phosphoric acid.

It is a further object of the present invention to provide an economical process for producing a liquid potassium-phosphate fertilizer from wet-process phosphoric acid, wherein the available amount of phosphoric anhydride is totally water soluble.

Another object is to provide a process for the production of water-soluble potassium polyphosphates from potassium chloride and wet-process phosphoric acid, which polyphosphates are obtained in high yield and essentially free of potassium metaphosphates.

Yet another object is to provide a process for the conversion of potassium chloride and wet-process phosphoric acid into high-analysis liquid fertilizer solutions of potassium polyphosphates, which solutions contain less than about two percent chloride ion.

These and other objects and advantages which will be obvious hereinafter are achieved by the present invention which is set forth in the following description wherein parts and percentages are by weight.

According to the present invention, potassium polyphosphate solutions and hydrogen chloride are produced by a process which comprises:

a. providing a concentrated wet-process phosphoric acid containing at least 60% $P_2O_5$, preferably about 69–76% $P_2O_5$, in the form of orthophosphoric acid and polyphosphoric acid;

b. continuously reacting said concentrated acid with substantially anhydrous potassium chloride at a temperature of 150°–500°C., preferably 200°–300°C., in the presence of a catalytic amount of a dehydrochlorination catalyst to form water-soluble potassium polyphosphate and hydrogen chloride, sufficient potassium chloride being reacted with the acid to produce a reaction melt having a $K_2O$ to $P_2O_5$ weight ratio between about 0.5 and 1.5;

c. continuously separating the hydrogen chloride from the reaction melt containing water-soluble potassium polyphosphate; and d. continuously quenching the resulting reaction melt in aqueous alkaline solution, preferably aqueous ammonia, of sufficient concentration to form a solution having a pH of 6 to 8 and a plant food content measured as $K_2O$ and $P_2O_5$ of 35–55 weight percent.

The concentrated wet-process phosphoric acid utilized in the process of the present invention can be obtained by evaporating commercial wet-process phosphoric acid containing about 25 to 55% $P_2O_5$. Such acid usually contains about 0.8 to 1.8% iron, 0.6 to 1.3% aluminum, 0.2 to 0.5% magnesium, 0.04 to 0.4% calcium, 0.04 to 0.1 percent potassium and 0.03 to 0.1% sodium, analyzed in the form of the respective oxides. However, some of the metal cations may be removed prior to use by any suitable means such as ion exchange.

Wet-process superphosphoric acid is preferably used in the process. Superphosphoric acid may be prepared in accordance with Canadian Patent 812,689, granted to Allied Chemical Corporation. Another process for concentrating wet-process phosphoric acid to produce a superphosphoric acid containing about 70% $P_2O_5$ is disclosed in Vol. 53, No. 9, Sept. 1961, of *Industrial and Engineering Chemistry*. In this process the wet-process phosphoric acid is introduced beneath the surface of a pool of the acid. Combustion products are also introduced into the pool of acid through a submerged burner. Superphosphoric acid containing a mixture of ortho and polyphosphoric acids is withdrawn at a fixed level from the pool, cooled and discharged to storage.

The potassium chloride feed for the process is desirably anhydrous; however, a small proportion of water can be tolerated in the potassium chloride if the wet-process phosphoric acid utilized in the process is highly concentrated.

Known dehydrochlorination catalysts may be utilized in the process, e.g., zinc compounds such as zinc chloride, strong acids such as sulfuric acid and nitric acid and salts of said acids, particularly ammonium salts. Desirable catalysts include sulfuric acid, ammonium sulfate and ammonium thiosulfate because sulfur contained therein furnishes a valuable plant food ingredient in the fertilizer product. Sulfuric acid is particularly effective as catalyst. The chief beneficial effect of the catalyst is to reduce the reaction temperature at which hydrogen chloride is effectively volatilized from the reaction mixture so that production of metaphosphates in the reaction mixture is substantially eliminated. Desirably, about 3 to 15 percent of sulfuric acid is used, based on the weight of the $P_2O_5$ in the reaction mixture.

It is advantageous to separately preheat the reactants to a temperature of at least 150°C., preferably 200°–300°C. prior to reaction, thereby avoiding the problem of heating the highly corrosive reaction mixture.

The pressure under which the reaction mixture is heated should be sufficiently low to allow efficient vaporization of the hydrogen chloride and any water vapor present. Pressures of 0.5 to 2 atmospheres are preferably used, thus permitting the use of less costly equipment.

A reaction temperature of 150° to 500°C., preferably 200° to 300°C. is utilized. A reaction time of at least 1 second, preferably 1 to 5 minutes, is required for adequate reaction. Surprisingly, at the specified $K_2O$ to $P_2O_5$ ratios, no iron or aluminum compounds precipitate. This is particularly unexpected in view of U. S. Pat. No. 2,415,797 which teaches that the metallic impurities of iron and aluminum precipitate out of wet-process phosphoric acid when it is heated to temperatures of 300°C. It may be theorized that the polyphosphates in the concentrated acid form chelates with the iron and aluminum which are stable at the specified $K_2O$ to $P_2O_5$ ratios.

The heating is continued until at least 80% of the hydrogen chloride has been volatilized from the reaction mixture and a substantially anhydrous potassium polyphosphate melt is obtained wherein at least 45 percent, preferably 60 to 80 percent of the $P_2O_5$ is present as polyphosphate. Prolonged heating should be avoided to avoid possible formation of metaphosphates. Generally, the reaction is complete within 5 minutes. A reactor designed for continuous reaction is desirable. With reactants preheated to 200°–300°C., the heat of reaction is sufficient to maintain the required reaction temperature without substantial loss or gain of heat from the reactor.

As indicated hereinabove, sufficient potassium chloride is reacted with the phosphoric acid in the high temperature reactor to produce a potassium polyphosphate melt having a $K_2O$ to $P_2O_5$ weight ratio between about 0.5 and 1.5. Preferably the melt has a $K_2O$ to $P_2O_5$ weight ratio between 0.8 and 1.2.

The potassium polyphosphate melt may be cooled and stored, but desirably is quenched directly in aqueous alkaline solution. The preferred solvent is aqueous ammonia of sufficient concentration to produce a solution containing about 2 to 5 percent nitrogen, 23 to 26% $K_2O$ and 20 to 27% $P_2O_5$. Temperature during dissolution is preferably maintained at about 30° to 100°C. If desired, the product potassium polyphosphate solution is readily filtered to separate any precipitated potassium sulfate.

The liquid potassium polyphosphate product of this process has particular value in the fertilization of crops because of its ability to supply easily dispensed primary nutrients as well as trace amounts of micronutrients, particularly iron in chelated form. Such solutions will remain stable, i.e., substantially free from precipitated iron and aluminum compounds for at least 30 days at normal temperatures.

DESCRIPTION OF THE PREFERRED EMBODIMENT

In order to demonstrate the invention, the following examples are given:

EXAMPLE I

Wet-process orthophosphoric acid containing 50.3% $P_2O_5$ is preheated to 130°C. and fed at the rate of 130 pounds per hour to a conventional falling film evaporator operating at 170°–190°C. at 20 mm Hg absolute pressure to form a concentrated phosphoric acid containing about 69–70% $P_2O_5$. A typical sample of this concentrated wet-process phosphoric acid having the following properties, which will hereinafter be referred to as "Solution A," is found to be useful for purposes of the present invention:

| | |
|---|---|
| Total $P_2O_5$, % | 69.40 |
| % of Total $P_2O_5$ as Polyphosphate $P_2O_5$ | 31.50 |
| $Fe_2O_3$, % | 2.19 |
| $Al_2O_3$, % | 1.14 |

Solution A, the above-described concentrated wet-process phosphoric acid, is preheated to about 250°C. and continuously pumped to an isothermal stirred tank reactor, together with about 3 percent of added ammonium thiosulfate, based on the weight of $P_2O_5$ in the feed. Sufficient anhydrous potassium chloride at 250°C. is fed into the reactor and reacted with the Solution A at about 250°C. to form a potassium polyphosphate melt containing about 38% $K_2O$ and about 46% $P_2O_5$. About 69 percent of the total $P_2O_5$ in the melt is converted to polymeric forms within 5 minutes reaction time in the stirred tank reactor. The polymeric forms include pyrophosphates and other polyphosphates. Hydrogen chloride and water vapor, flashed from the reactor are reclaimed in a conventional vertical scrubber by passing the gases counter-currently to dilute aqueous hydrochloric acid solution.

The potassium polyphosphate melt from the reactor at about 250°C. is continuously pumped at about 187 pounds per hour to a mix tank where it is injected into a cooled stream of recycled product aqueous potassium polyphosphate together with sufficient ammonia and water to form a solution containing about 3 percent nitrogen, 23% $K_2O$ and 27% $P_2O_5$ having about 69 percent of the total $P_2O_5$ in polyphosphate form. Solution pH is about 6.5.

EXAMPLE II

The wet-process orthophosphoric acid employed in this example contains about 50% $P_2O_5$, 2.8% $H_2SO_4$, about 1.9% $Fe_2O_3$, about 1.0% $Al_2O_3$, about 0.5% F and about 44 percent water. Superphosphoric acid is prepared from this wet-process phosphoric acid in accordance with Example I of Canadian Patent 812,689, granted to Allied Chemical Corporation. The resulting superphosphoric acid is essentially free of insolubles and contains 72.6 percent total $P_2O_5$ of which 68 percent is in polyphosphate (non-ortho) form. This superphosphoric acid may be stored prior to use.

The superphosphoric acid is pumped to a preheater where it is preheated to about 280°C. As prepared, the superphosphoric acid has a temperature of about 260°C. and will need little preheat. Heat is supplied by tube and shell heat transfer from high pressure steam. About 827 pounds of preheated acid and 804 pounds of potassium chloride are fed to the first section of the reactor, described below.

The reactor consists of an elongated horizontal box constructed of steel lined with carbon brick. The reactor is sized so that only the lower portion is filled with the liquid reaction mixture, the upper portion being reserved for hydrogen chloride gas given off during the reaction. The elongated box reactor contains a baffle plate halfway down the length of the reactor, which baffle extends about halfway to the top of the reactor. This baffle arrangement allows substantial separation of the fluid contents of the reactor into two reaction zones but permits uninhibited degassing of the hydrogen chloride gas formed in both reaction zones. Both sections of the reactor are agitated to provide good contact between the potassium chloride crystals and the superphosphoric acid, and the compartment arrangement reduces the amount of unreacted potassium chloride carried out of the reactor with the product. The liquid reaction mixture overflows from the first reaction zone into the second reaction zone. Moreover, additional compartments may be provided in the reactor, if desired. Thus, the liquid reaction mixture may be considered to flow through the reactor substantially in plug flow, i.e., there is essentially no back-mixing of the reaction mixture at the exit end of the elongated reactor with the reaction feed at the other end of the reactor.

About 41 pounds of strong sulfuric acid (98% $H_2SO_4$) is fed to the second section of the two-section reactor. Sulfuric acid is added to the second reaction section to assist in driving the remaining hydrogen chloride out of the reaction mixture. It was found that more effective hydrogen chloride elimination from the reaction mixture is achieved when the sulfuric acid catalyst is added to the second section of the reactor than when the catalyst is added to the first section. Total retention time of the reactants in the reactor is about 5 minutes. Sufficient heat is put into the reactor feeds to preclude need for transfer of heat into the reactor.

The hydrogen chloride volatilized from the reaction mixture at 280°C. is essentially anhydrous and amounts to about 355 pounds per hour. It is removed from the reactor via ducts, for recovery or disposal by conventional means.

The molten effluent withdrawn from the second reaction zone amounts to about 1300 pounds per hour; it contains by weight, about 83 percent potassium phosphates (mainly polyphosphates), about 8 percent potassium sulfate and about 4.5 percent potassium chloride. The molten effluent is fed by pump into a circulating aqueous product mixture which passes through a shell and tube cooler where the mixture is cooled to about 70°C. and then recirculated. Sufficient ammonia and water are added to the circulating mixture to provide a liquid product containing 3 percent nitrogen, 27% $P_2O_5$ and 23% $K_2O$. About 72 pounds per hour of ammonia and about 624 pounds per hour of water are required. About 2000 pounds per hour of the liquid product is withdrawn from the system. This product is preferably filtered to remove precipitated potassium sulfate and produce a clear green solution which is stable for at least 30 days.

EXAMPLE III

The procedure of Example II is repeated except that amounts of reactants are added to produce a product containing more $K_2O$ than $P_2O_5$. The superphosphoric acid feed to the reactor is about 552 pounds per hour and the potassium chloride feed is about 844 pounds per hour. Sulfuric acid amounting to about 55 pounds per hour is added to the second section of the reactor. The reactor is operated at 400 mm Hg absolute pressure and 265°C., total reaction time in the two reaction zones being 5 minutes.

Essentially anhydrous hydrogen chloride amounting to about 360 pounds per hour is continuously removed from the top portion of reactor via ducts. The potassium polyphosphate melt is continuously withdrawn from the second reaction zone at the rate of about 1080 pounds per hour; it contains, by weight, about 77 percent potassium phosphates (mainly polyphosphates); about 11 percent potassium sulfate, and about 7.8 percent potassium chloride. The molten effluent is continuously quenched in a circulating aqueous product mixture which is cooled to 70°C. About 869 pounds per hour of water and about 50 pounds per hour of ammonia are continuously added to the circulating quench solution. About 2000 pounds per hour of the circulating product solution is withdrawn from the system and filtered to remove precipitated potassium sulfate and produce a clear green potassium polyphosphate solution. This solution contains 2 percent nitrogen, 20% $P_2O_5$ and about 24% $K_2O$ by weight.

I claim:

1. A continuous process for producing hydrogen chloride and potassium polyphospate fertilizer solution, which comprises:

a. providing a concentrated wet-process phosphoric acid containing 69 to 76% $P_2O_5$ in the form of orthophosphoric acid and polyphosphoric acid, at a temperature of 200° to 300°C.;

b. continuously reacting said hot concentrated acid with sufficient substantially anhydrous potassium chloride to form a reaction melt having a $K_2O$ to $P_2O_5$ weight ratio between about 0.8 and 1.2, said reaction being carried out in the presence of 3 to 15 percent of sulfuric acid, based on the weight of the $P_2O_5$ in the reaction mixture, and at a temperature of 200° to 300°C. until at least 90 percent of said potassium chloride is reacted, said reaction being conducted at a pressure of 0.5 to 2 atmospheres within a period of time of about 1 to 5 minutes;

c. continuously separating hydrogen chloride from the reaction melt containing water-soluble potassium polyphosphate; and d. continuously quenching the resulting reaction melt in aqueous ammonia of sufficient concentration to form a potassium polyphosphate fertilizer solution having a pH of 6 to 8 and a plant food content measured as $K_2O$ and $P_2O_5$ of 35–55 weight percent.

* * * * *